United States Patent
Isaacs et al.

(10) Patent No.: US 10,176,079 B2
(45) Date of Patent: Jan. 8, 2019

(54) IDENTIFICATION OF ELEMENTS OF CURRENTLY-EXECUTING COMPONENT SCRIPT

(75) Inventors: Malcolm Isaacs, Modiln (IL); Yoav Eilat, Mountain View, CA (US); Tal Halperin, Rishon Le-Zion (IL); Michael Pogrebisky, Rishon Le-Zion (IL); Rachel Kahana Samet, Modlin (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 586 days.

(21) Appl. No.: 12/918,389

(22) PCT Filed: Feb. 29, 2008

(86) PCT No.: PCT/US2008/055479
§ 371 (c)(1),
(2), (4) Date: Aug. 19, 2010

(87) PCT Pub. No.: WO2009/108203
PCT Pub. Date: Sep. 3, 2009

(65) Prior Publication Data
US 2010/0325492 A1 Dec. 23, 2010

(51) Int. Cl.
G06F 9/44 (2018.01)
G06F 11/36 (2006.01)
(52) U.S. Cl.
CPC ........ G06F 11/3664 (2013.01); G06F 11/368 (2013.01); G06F 11/3684 (2013.01)
(58) Field of Classification Search
CPC .............................. G06Q 10/00; G06Q 30/02
(Continued)

(56) References Cited

U.S. PATENT DOCUMENTS 5,600,789 A * 2/1997 Parker ................. G06F 11/3688
714/38.11
5,896,495 A * 4/1999 Stein ................... G06F 11/3672
713/400

(Continued)

FOREIGN PATENT DOCUMENTS

JP 2001-306358 11/2001
WO WO-2007118271 A1 10/2007

OTHER PUBLICATIONS

China Patent Office, First Office Action of the subject patent application, dated May 9, 2012, China.

(Continued)

Primary Examiner — Robert D Rines (57) ABSTRACT

An apparatus (100) in an example comprises a test-script generator (704) and selection logic (114). The test-script generator (704) serves to create a test script (116) through identification of currently-available elements (604, 606, 608, 610, 612, 614, 616, 618) of an application (106) under test. The test script (116) is employable to exercise the application (106). The selection logic (114) serves to identify elements (406, 408) of a currently-executing component script (402) within the test script (116), contemporaneous with execution of the test script (116), that may be affected by graphical user interface changes made to the application (106). The identification of the elements (406, 408) of the currently-executing component script within the test script (116), contemporaneous with execution of the test script (116), that may be affected by the graphical user interface changes by the selection logic is contemporaneous with the exercise of the application (106) by the test script (116).

17 Claims, 7 Drawing Sheets

(58) Field of Classification Search
USPC .......................... 717/101–178; 718/101–108
See application file for complete search history.

(56) References Cited

U.S. PATENT DOCUMENTS

| | | | |
|---|---|---|---|
| 6,701,514 B1 | 3/2004 | Haswell et al. | |
| 6,978,218 B1* | 12/2005 | Kolb | G06F 11/3688 |
| | | | 702/121 |
| 7,076,713 B1* | 7/2006 | Hess | G06F 11/263 |
| | | | 714/741 |
| 7,313,564 B2 | 12/2007 | Melamed et al. | |
| 2003/0202012 A1 | 10/2003 | Kemp | |
| 2003/0236775 A1 | 12/2003 | Patterson | |
| 2005/0021289 A1* | 1/2005 | Robertson | G06F 11/3696 |
| | | | 702/182 |
| 2005/0166094 A1 | 7/2005 | Blackwell | |
| 2005/0234708 A1* | 10/2005 | Meehan | G06F 8/20 |
| | | | 704/9 |
| 2007/0266371 A1 | 11/2007 | Ramakrishnan | |
| 2008/0109794 A1* | 5/2008 | Adams et al. | 717/130 |
| 2008/0127103 A1* | 5/2008 | Bak | 717/126 |
| 2008/0320462 A1* | 12/2008 | Bergman | G06F 9/45512 |
| | | | 717/168 |
| 2009/0320002 A1* | 12/2009 | Peri-Glass et al. | 717/131 |
| 2010/0005447 A1* | 1/2010 | McCoy | 717/115 |
| 2011/0271255 A1* | 11/2011 | Lau et al. | 717/124 |

OTHER PUBLICATIONS

International Searching Authority, International Search Report and the Written Opinion, 10 pages, dated Nov. 2008.
European Patent Office, Extended European Search Report, dated Sep. 28, 2012, 6 pages, The Hague, Netherlands.

* cited by examiner

IDENTIFICATION OF ELEMENTS OF CURRENTLY-EXECUTING COMPONENT SCRIPT

BACKGROUND

Test automation software seeks to ensure that an application under test performs correctly. A defect or functional change introduced into the system may cause a test to fail. A system failure because of a functional change would result from the test software being outdated. Upon knowledge a change has occurred in the application under test, all tests may be run to try to avoid problems in the system from the change to the application.

DESCRIPTION OF THE DRAWINGS

Features of exemplary embodiments will become apparent from the description, the claims, and the accompanying drawings in which:

DETAILED DESCRIPTION

Referring to the BACKGROUND section above, it may be desirable to automatically update the test to keep up with changes made to the software application. It may be desirable to have information on the potential impact of a known change and run only a subset of tests which could potentially be affected by the change. Human and computing time and resources may be saved.

An embodiment creates a subset of tests to be run based on an analysis of change impact. An embodiment automatically decomposes the application to be tested into discrete, auto-parameterized test components, and generates an ordered sequence of components to form a set of logical flows of activity within the application that are subsequently used to test the application. Both benign and critical changes to the application are automatically detected, and the component can be automatically updated to reflect the change in the behavior of the application.

An embodiment allows the user to navigate the application, or a part of the application, while the embodiment records the actions performed during the navigation. For example, a user with knowledge about navigation of the application may employ such an embodiment without knowledge directed to software testing. The actions are broken down into self-contained components, and any data entered by the user is also captured. The data is automatically parameterized, to allow different data sets to be used without having to make any changes to the components. A test having these components is created and can be run to accurately, faithfully, and/or correctly reproduce the actions taken when the navigation was originally performed.

Automatic creation of components allows the user to reuse them with reduced, low, and/or minimal effort to create new flows and use different data that exercises different parts of the application under test. A system automatically identifies the changes that have been made to the system, and automatically makes corresponding and/or appropriate changes and/or updates to the relevant component for the test to succeed and/or pass. Time and effort may be saved in analysis, application, and/or debugging of changes needed to pass the test. In the event of a defect in the application under test, the system automatically raises a defect into a defect management system for tracking.

An embodiment quickly and efficiently creates a suite of tests that run against target software such as offered by SAP AG, headquartered in Walldorf, Germany (World Wide Web SAP dot COM). The tests serve to validate software customizations and provide simple and efficient updating of the tests.

A Flow object comprises a series of self-contained Business Components. The Business Components can be chained together with other Flows and Business Components to form a Test. The Flow can be recorded automatically. The Business Components can be automatically parameterized.

An object of type Flow is created to represent a logical flow of operation through the application under test. Pressing a Learn Flow button may prompt the user to open up the application under test at the point at which the Flow is to begin. From that point on, all actions performed on the application under test are recorded by the system. The recording may be accompanied by a relatively small, unobtrusive toolbar which can be used to control the recording, providing options such as stopping the recording, pausing it and resuming it.

When the recording is complete, the system analyzes the recording, and breaks it down into an ordered list of discrete components. Each user-interface element which accepts data may be represented in the component by a piece of script that enters data into the element using a variable to represent the relevant data item, rather than directly specifying the data within the script. The variable is automatically assigned as a parameter to the component, and its default value is the data item entered by the user. If the user does not enter data into that element, an embodiment can choose not to represent that element in the script, or alternatively to represent that element in the script with a variable representing the data, assigned as a parameter to the Business Component, with its default value being the current value of the element. Output parameters are also automatically detected and created by the system. A record is kept of which user-interface elements are present for each component, including such user-interface elements that were not touched by the user in the course of recording the Flow. The user determines where these components will be stored, for example in a Quality Management system such as a product under the trade identifier QUALITY CENTER by Hewlett-Packard Company, headquartered in Palo Alto, Calif., United States (World Wide Web HP dot COM). The Flow object is updated with references to the Business Components that were stored in Quality Center. The Flow can then be used as a building block within Business Process Tests in Quality Center. The Flow can be configured to have input parameters, which are passed into its constituent Business Components.

A Business Component may be edited prior the Business Component being stored, for example, or at any time after the Business Component is stored. Steps may be added, removed, or modified in the Business Component and/or parameters may be added, removed, or modified in the Business Component, without preventing, harming, and/or negatively impacting the function of the Business Component.

Business Components and Flows can also be configured to have output parameters, which are passed on to subsequent Flows and Business Components in the Business Process Test. If the execution of a Business Component within a Flow depends on the value of a parameter, a Run Condition (which may be referred to as "branching") can be configured for that Business Component. The value of a parameter at the current point of execution can be compared to a particular value. If the condition is satisfied, the Business Component is executed. Otherwise, the Business Component is not executed. The system can be configured to fail if the Run Condition is not satisfied, or to ignore it and move on to the next Business Component in the Flow.

A Business Process Test can be configured to run in a mode that may be called "Change Detection Mode". In addition to executing the Business Process Test to check the application under test, this has the effect of recording all of the user-interface elements encountered during playback. These user-interface elements are compared with the user-interface elements noted when the Business Component was created, and a note is made of any changes. This detects changes such as significant user-interface elements that have been added or removed, thus causing the test to fail, and also benign changes, such as a non-significant field that has been added. A report of the test is generated after the test is run. Each change that was detected is presented to the user, who can decide whether to update the relevant Business Component to reflect the change, or whether to enter a defect into the defect management system. There is also an option to ignore the change and do nothing. For example, the user might choose such an option if the user wishes to manually update the Business Component.

A list of Business Process Tests that should be run in Change Detection Mode can be created manually by the user, or automatically generated by Change Impact Testing software that determines the subset of tests that may be affected by a change in the application under test, and automatically creates a Test Set as a list of tests which are to be run in Change Detection Mode. It can also automatically set the system to run the relevant Business Process Tests in Change Detection Mode.

An exemplary embodiment automatically performs a breakdown of a flow of activity through the application under test into components. Exemplary automation occurs non-contemporaneously with previous user input and without active contemporaneous user input. An exemplary embodiment also parameterizes the components. An exemplary implementation provides a speedy and accurate way of creating both flows and components, and allows the extension and reuse of components without having to rerecord them or delve into the underlying script. The Run Condition provides a simple way to control a Flow and extend it beyond its original capabilities without having to even see the underlying script.

The integration with Change Impact Testing software can reduce the number of tests that need to be executed if a change has been made to the system. This can offer a saving in the time to find out the real effect of a change. When a change has been detected, the component can be automatically updated without the user having to understand how the component works. This saves time which may otherwise be spent on test and component maintenance. Since the system hides all of the technical details behind the tests, the system is made more accessible to less technical users.

Change Impact Testing determines the list of tests that may be affected by a change that was introduced into the system. The Change Impact Testing mechanism creates a set of tests which is automatically configured to run in Change Detection Mode.

Figure 1:
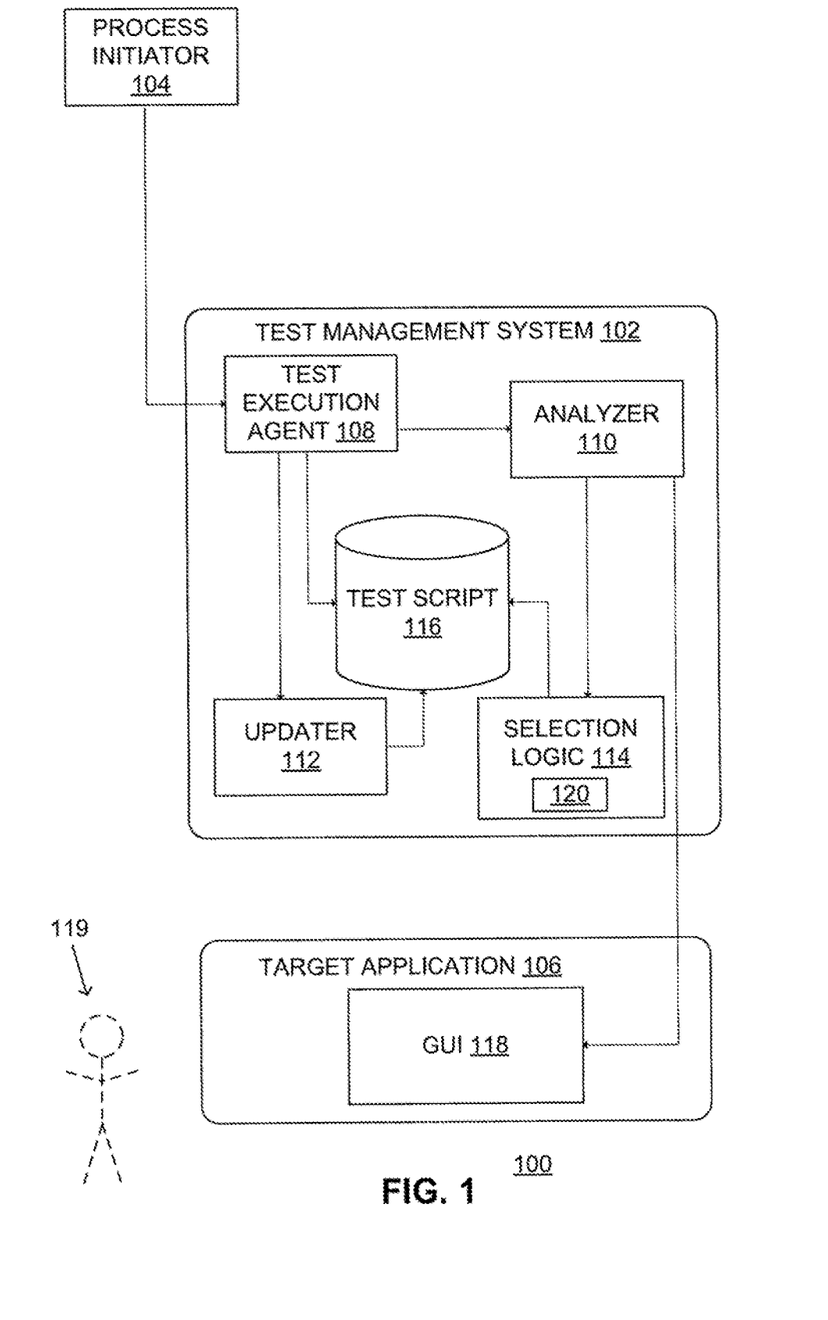
FIG. 1 is a representation of an embodiment of an apparatus that comprises a test management system that is initiated by a process initiator to test a target application.

Turning to FIG. 1, an embodiment of an apparatus 100 comprises a test management system 102 that is initiated by a process initiator 104 to test a target application 106. The process initiator 104 comprises a human or computer software agent. The target application 106 comprises an application under test. The target application 106 is to have its behavior tested and comprises a user interface such as a graphical user interface (GUI) 118.

Figure 7:
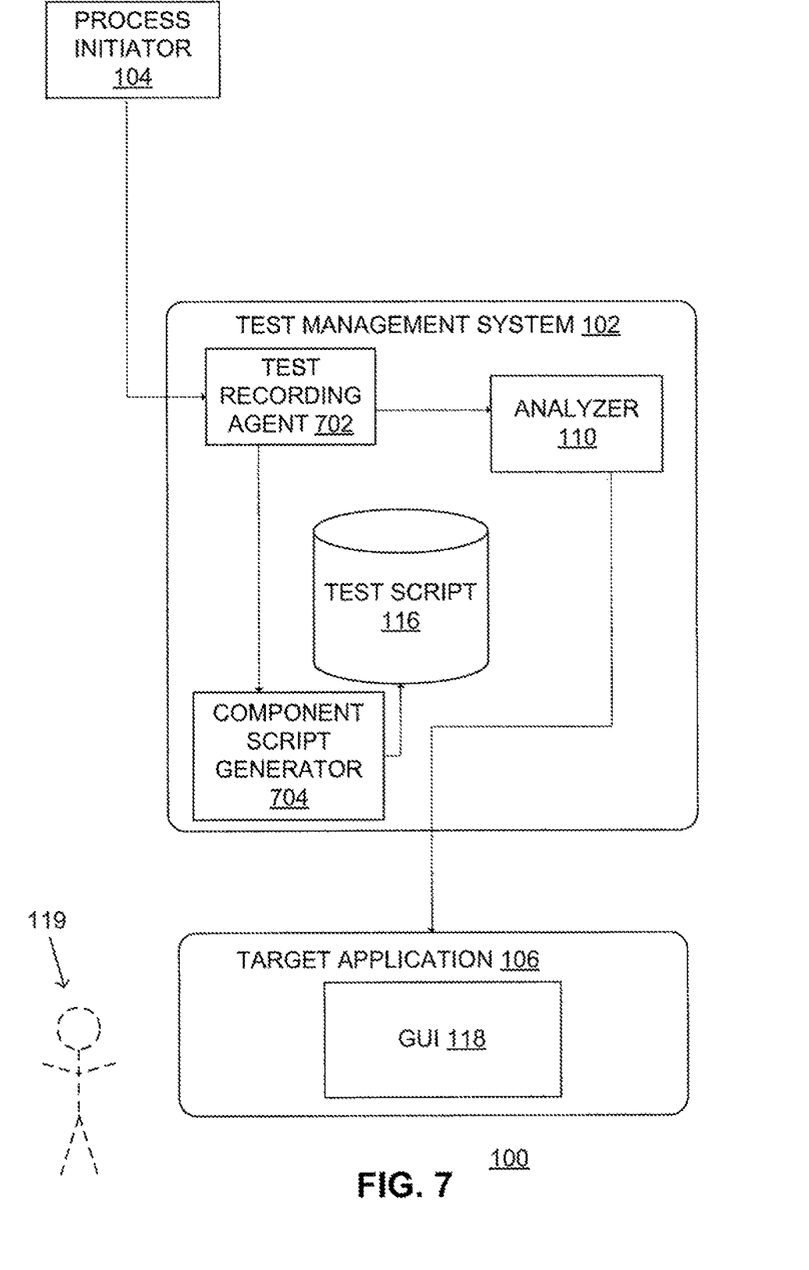
FIG. 7 is a representation of a further embodiment of the test management system of an embodiment of the apparatus of FIG. 1 with the analyzer and the test script of the test management system of FIG. 4, and further illustrates a test recording agent and a test script generator.

An embodiment of the test management system 102 manages a lifecycle of tests on the target application 106 and comprises a test execution agent 108, an analyzer 110, an updater 112, selection logic 114, and a test script 116. A user 119 may operate and/or interact with the GUI 118, for example, to provide additional data to the target application 106 such as may assist the test execution agent 108 to proceed with execution. As described herein, a further embodiment of the test management system 102 comprises the analyzer 110, the test script 116, a test recording agent 702 (FIG. 7), and a test script generator 704 (FIG. 7).

Figure 4:
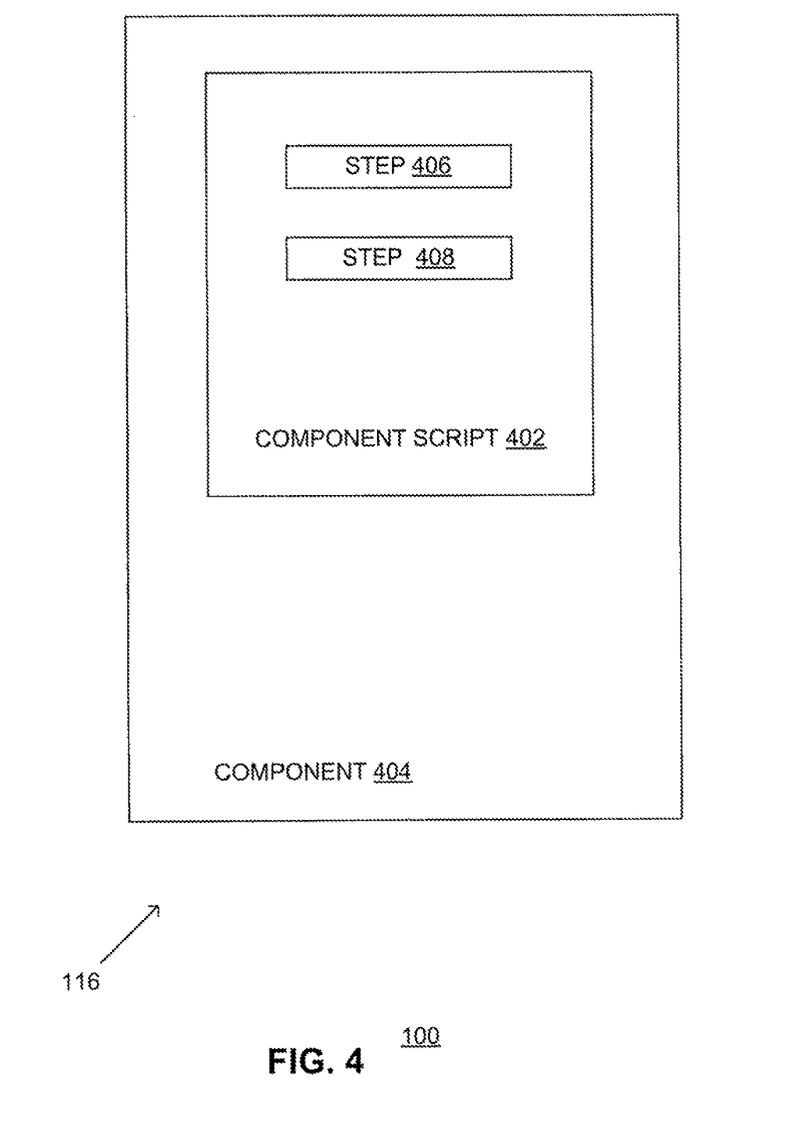
FIG. 4 is a representation of the test management system of an embodiment of the apparatus of FIG. 1 and illustrates a test execution agent that executes a test on the target application of FIG. 1 through employment of a component script within a test script.

Referring to FIGS. 1 and 4, the test execution agent 108 executes a test on the target application 106 through employment of a component script 402 within the test script 116. The component 404 comprises a component script 402 that comprise one or more steps 406, 408. Steps 406, 408 comprise an exemplary implementation of an algorithm, procedure, program, process, mechanism, engine, model, coordinator, module, element, application, software, code, and/or logic. The analyzer 110 comprises a target interface analyzer and/or user interface analyzer directed to the GUI 118 of the target application 106. The test script 116 comprises a collection of component scripts 402 arranged in a specific order for employment in testing by the test execution agent 108 to exercise the target application 106. The order of the component scripts 402 determines the sequence in which steps 406, 408 are executed against the target application 106. The order of steps 406, 408 may be fixed. The order of execution of steps 406, 408 may be sequential and/or follow an arrangement such as may be implemented in the test script 116.

The component script 402 in an example comprises one or more steps 406, 408. The updater 112 serves to update the steps 406, 408 for testing of the target application 106. The selection logic 114 comprises a comparison engine 120 that reviews the steps 406, 408 relative to the GUI 118.

Figure 5:
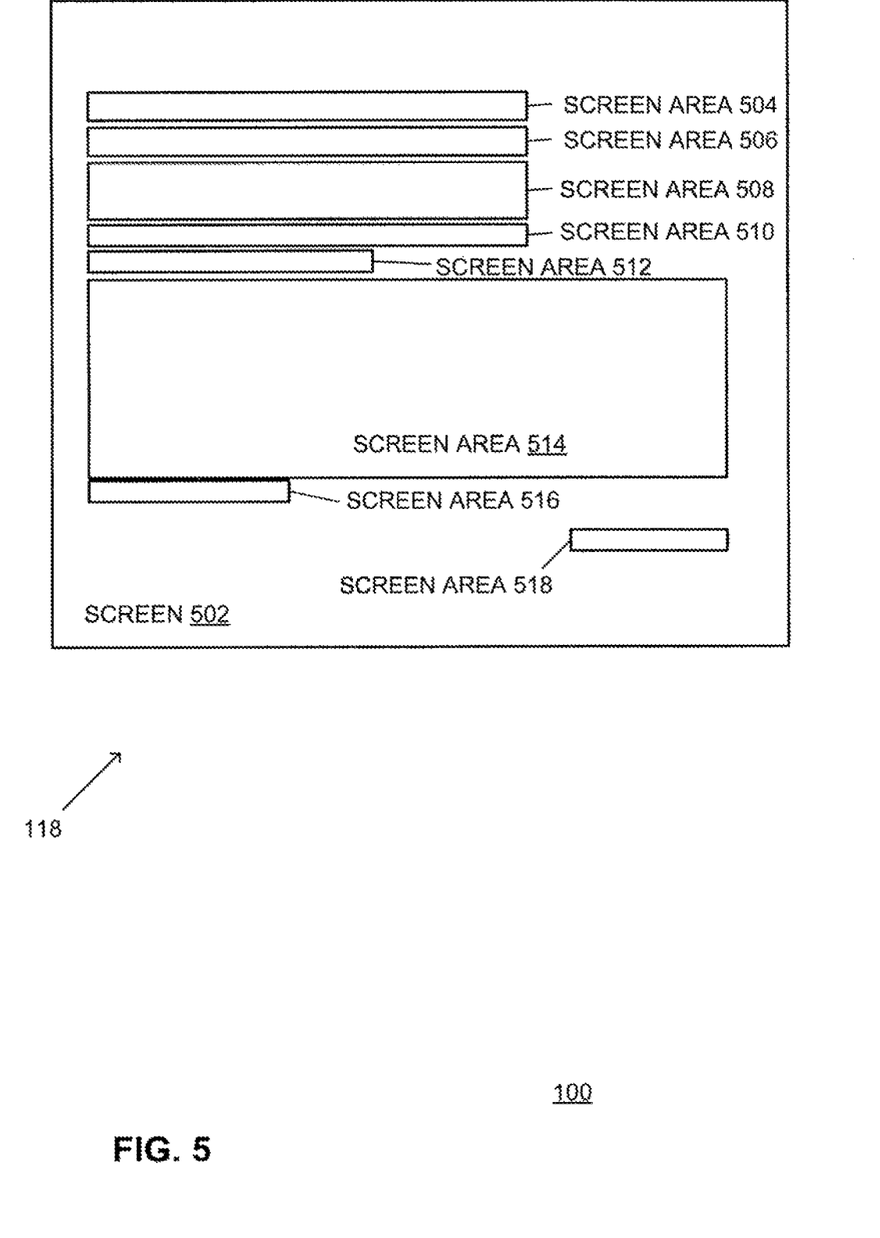
FIG. 5 is a representation of a graphical user interface (GUI) of the target application of an embodiment of the apparatus of FIG. 1.

Turning to FIG. 5, the GUI 118 may comprise a screen 502. The screen 502 comprises one or more screen areas 504, 506, 508, 510, 512, 514, 516, 518. An exemplary screen area 504, 506, 508, 510, 512, 514, 516, 518 comprises one or more user interface (UI) controls such as edit fields, check boxes, and/or lists.

Figure 6:
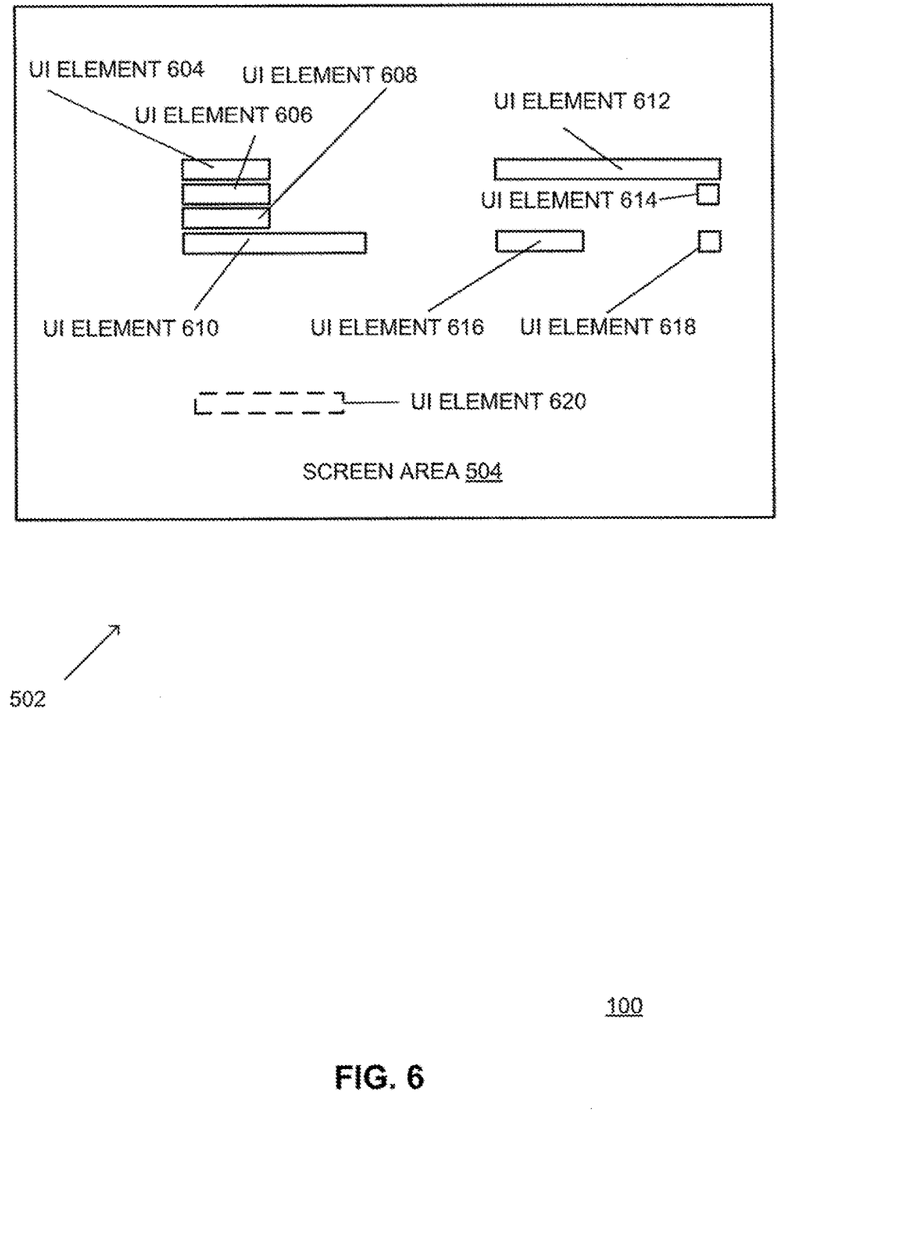
FIG. 6 is a representation of a screen area of an embodiment of the GUI of the target application of FIG. 5.

Referring to FIGS. 5 and 6, an exemplary screen area 504, 506, 508, 510, 512, 514, 516, 518 comprises one or more user interface (UI) elements 604, 606, 608, 610, 612, 614, 616, 618. Referring to FIGS. 4 and 6, an exemplary step 406, 408 corresponds to an input field such as a user interface (UI) element 604, 606, 608, 610, 612, 614, 616, 618. For example, a one-to-one relationship may exist between the steps 406, 408 and the UI elements 604, 606, 608, 610, 612, 614, 616, 618. For example, the step 406 may correspond to the UI element 604 and the step 408 may correspond to the UI element 606. The steps 406, 408 may comprise an arrangement of input fields such the UI elements 604, 606, 608, 610, 612, 614, 616, 618. An example of a change to the UI is represented by an addition of UI element 620.

In an exemplary implementation, a step 406, 408 in the component script 402 corresponds to a UI element 604, 606, 608, 610, 612, 614, 616, 618 in the screen area 504 of the screen 502. A screen area 504 may be reused within a target application 106, and different data may be entered each time the screen area 504 is encountered within the target application 106. To allow a single instance of the component script 402 to be employable on each and all of these occasions, an exemplary approach may allow configurability in entry of the actual values into the UT elements 604, 606, 608, 610, 612, 614, 616, 618, in place of explicit determination within the step 406, 408. This may allow parameterization of a step 406, 408 for the step 406, 408 to comprise a reference to a variable, in place of explicit values of data. Prior to execution of a test by the test execution agent 108 on the target application 106 through employment of the component script 402 within the test script 116, the test execution agent 108 may assign values to variables from parameterization of the step 406, 408, or may assign values of other variables whose values are determined during the execution of the component script 402 by the test execution agent 108.

An order of the component scripts 402 may determine a sequence in which the test execution agent 108 executes the steps 406, 408 against the target application 106. The screen area 504 of the screen 502 of the GUI 118 may comprise a combobox such as a drop-down list that may be enabled and disabled as the UI element 604, and an edit box that may be enabled and disabled as the UI element 606. At a given time, the combobox as the UI element 604 in the screen area 504 is enabled and the edit box as the UI element 606 in the screen area 504 is disabled. A user 119 may select an option in the combobox as the UI element 604 in the screen area 504 and cause the edit box as the UI element 606 in the screen area 504 to be enabled. The user 119 selects the option in the combobox as the UI element 604 in the screen area 504 before attempting to insert text into the edit box as the UI element 606 in the screen area 504.

The step 406 of the component script 402 of the test script 116 may correspond to the combobox as the UI element 604 in the screen area 504. The step 408 of the component script 402 of the test script 116 may correspond to the edit box as the UI element 606 in the screen area 504. The component script 402 of the test script 116 ensures that the step 406 is executed by the test execution agent 108 before the step 408 is executed by the test execution agent 108, so the user 119 selects the option in the combobox as the UI element 604 in the screen area 504 to cause the edit box as the UI element 606 in the screen area 504 to be enabled, before attempting to insert text into the edit box as the UI element 606 in the screen area 504.

The test execution agent 108 executes each step 406, 408 of the component script 402 in order. The analyzer 110 reads the GUI 118 of the target application 106. The selection logic 114 compares the currently executing step 406, 408 with the GUI 118 of the target application 106 as read by the analyzer 110.

The analyzer 110 reads the GUI 118 of the target application 106. The selection logic 114 compares the GUI 118 of the target application 106 at any at any given moment in time with a component script 402 from the test script 116. The updater 112 updates component scripts 402 from the test script 116 according to the results of the selection logic 114. The process initiator 104 initiates management of the test.

Figure 2:
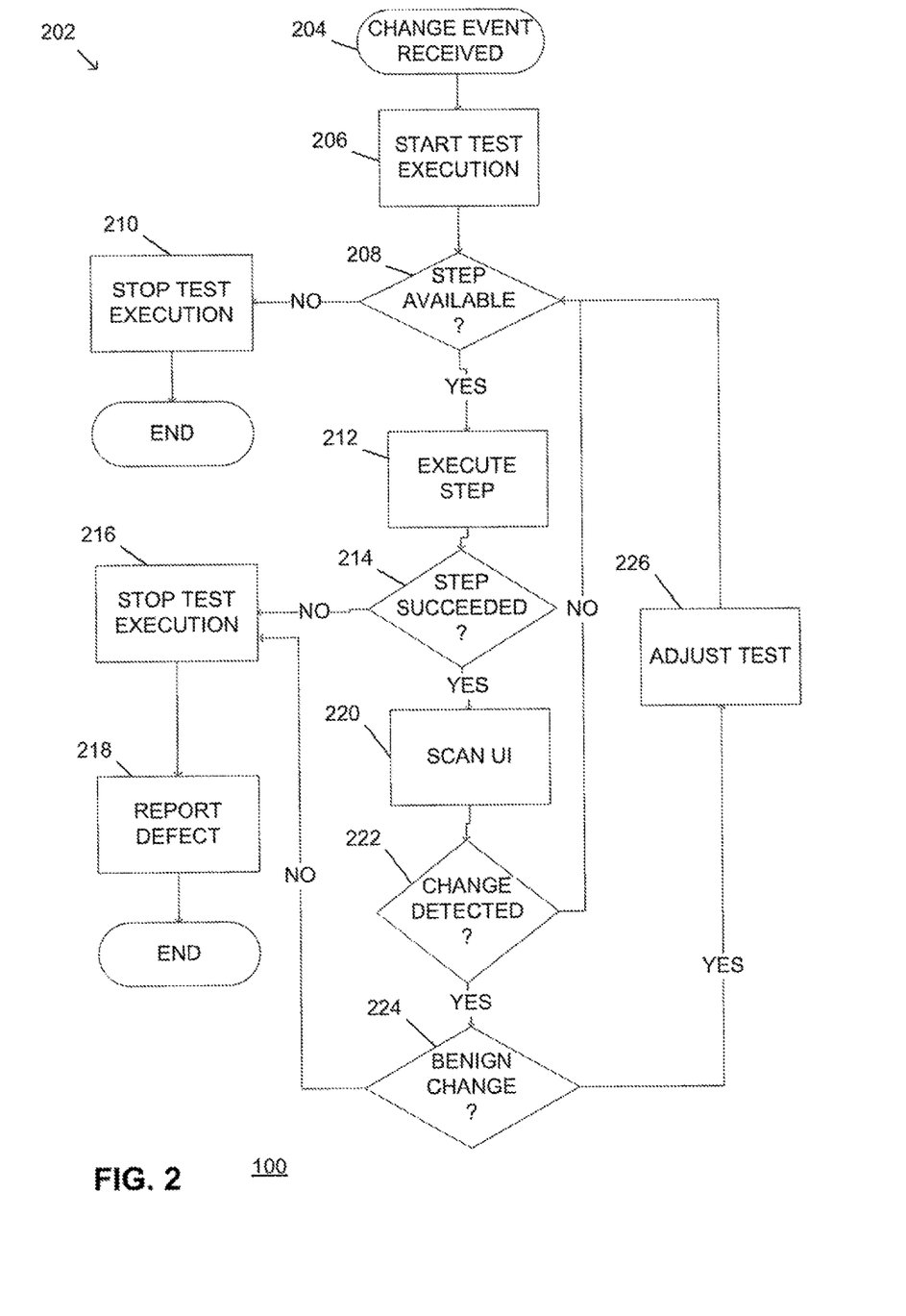
FIG. 2 is a representation of an exemplary process flow for an embodiment of the apparatus of FIG. 1.

An illustrative description of an exemplary operation of an embodiment of the apparatus 100 is presented, for explanatory purposes. Turning to FIG. 2, in an exemplary logic flow 202 at STEP 204, test execution agent 108 receives a change event notice or trigger. If the test management system 102 determines a change occurred, the test management system can initiate the logic flow 202 such as by providing the notice or trigger. A human as the process initiator 104 can manually initiate the logic flow 202. At STEP 206 the test execution agent 108 starts execution of a test of the target application 106. At STEP 208 the test execution agent 108 makes a determination whether another executable step of the target application 106 is available. If NO, the test execution agent 108 stops execution of the test of the target application at STEP 210. If YES, the test execution agent 108 continues the test and executes the next step of the target application at STEP 212.

At STEP 214 the test execution agent 108 makes a determination whether execution of the last step of the target application 106 has succeeded. If NO, the test execution agent 108 stops execution of the test of the target application at STEP 216 and reports a defect in the target application 106 at STEP 218. If YES, the test execution agent 108 instructs the analyzer 110 to scan the GUI 118 at STEP 220 and the selection logic 114 makes a determination whether another change has been detected at STEP 222. The determination is made by comparing the output of the analyzer 110 to the relevant component in the test script 116.

If NO, the test execution agent 108 returns from STEP 222 to STEP 208 and proceeds. If YES, the test execution agent 108 makes a determination whether the change is benign at STEP 224. A benign change is one that neither changes the flow of execution nor causes an error to be generated if that change is not addressed in the test script 116. If NO, so the change is identified as harmful or threatening, the test execution agent 108 proceeds to STEP 216 to stop execution and then STEP 218 to report a defect. If YES, the test execution agent 108 instructs the updater 112 to adjust the test of the target application 106 at STEP 226.

In another example in place of STEP 226, the test execution agent 108 may accumulate changes and store them in the test script 116, while continuing to execute the test of the target application 106. Upon completion of the test of the target application 106, the changes would be available for review by the user such as the process initiator 104. The user as the process initiator 104 can then decide to apply the appropriate changes to the test of the target application 106.

Figure 3:
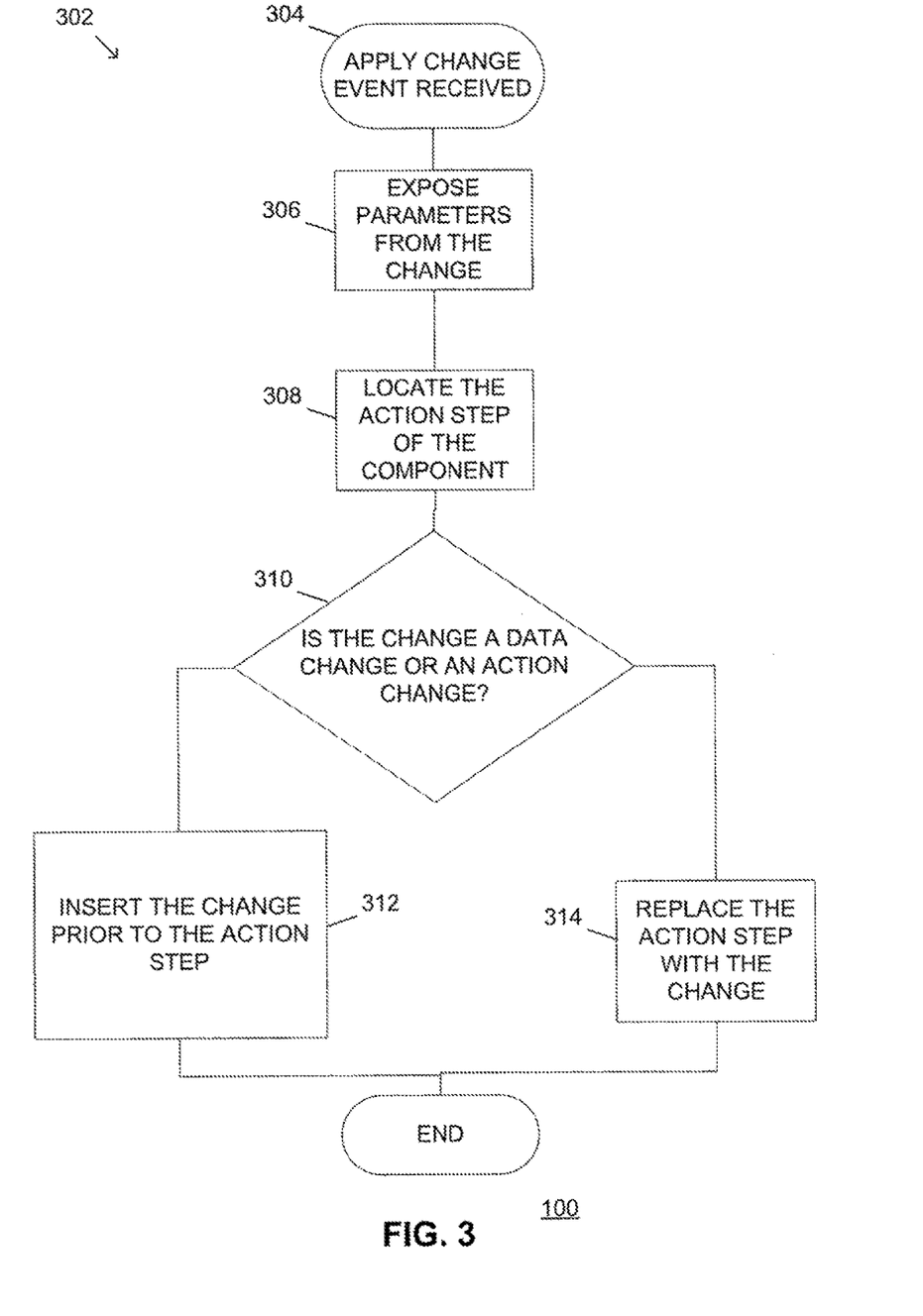
FIG. 3 is a representation of an exemplary process flow of an embodiment of the apparatus of FIG. 1 and illustrates an exemplary application of a change.

An illustrative description of an exemplary operation of an embodiment of the apparatus 100 is presented, for explanatory purposes. Turning to FIG. 3, in an exemplary logic flow 302 at STEP 304, test execution agent 108 applies a change event notice or trigger such as may have been received in at STEP 204 in logic flow 202 of FIG. 2. Logic flow 303 represents the application of a change to a component 404 (FIG. 4). The test execution agent 108 at STEP 306 exposes parameters from the change. For example, the text of an edit box may be exposed as the parameter. The test execution agent 108 at STEP 308 locates an action step as an exemplary step 406, 408 (FIG. 4) of the component 404. The action step as an exemplary step 406, 408 may cause the screen 502 (FIG. 5) to change. An exemplary component 404 comprises data steps as exemplary steps 406, 408 that apply data to controls on the screen 502. When all data steps as exemplary steps 406, 408 are completed by the test execution agent 108, the action step as an exemplary step 406, 408, for example, a submit button, may be executed by the test execution agent 108.

The test execution agent 108 at STEP 310 makes a determination whether the change is a data change or an action change. If the determination is for a data change at STEP 310, the test execution agent 108 proceeds to STEP 312. The test execution agent 108 at STEP 312 inserts the change before the action step. The test execution agent 108 may assign a default value to the data step to represent the changed data. If the determination is for an action change at STEP 310, the test execution agent 108 proceeds to STEP 314. The test execution agent 108 at STEP 314 replaces the action step with the change.

Referring to FIG. 7, a further embodiment of the test management system 102 comprises the analyzer 110, the test script 116, the test recording agent 702, and the test script generator 704. The process initiator 104 begins a process of recording actions performed by the user 119 on the GUI 118 of the target application 106, by initializing the test recording agent 702. The test recording agent 702 manages the analysis of the GUI 118 of the target application 106 by utilizing the analyzer 110. The analyzer 110 notes each action performed on the GUI 118 of the target application 106, and notes any data that is entered into the GUI 118 of the target application 106. When the analyzer 110 determines that the GUI 118 of the target application 106 has changed, the test recording agent 702 initiates the component script generator 704 which stores the actions and data that have been analyzed until that point as a component script 402 (FIG. 4).

Referring to FIGS. 4 and 7, the test recording agent 702 in an example may cause the component script generator 704 to store the component script 402 in the test script 116. The test recording agent 702 then continues to record into a new instance of a component script 402 and the process is repeated until the recording process is stopped by the user 119. In another example, test recording agent 702 may store in memory all component scripts 402 that have been recorded until the recording process is complete, and then store all component scripts 402 (FIG. 4) in the test script 116. In an exemplary embodiment, before or after the test recording agent 702 or the component script generator 704 stores the component script 402, the user 119 may be allowed to add, remove, or modify steps in the component script 402, or to add, remove or change the parameters of the component 404, without negatively impacting the functioning of the component 404.

An exemplary embodiment comprises a test-script generator 704 and selection logic 114. The test-script generator 704 serves to create a test script 116 through identification of currently-available elements 604, 606, 608, 610, 612, 614, 616, 618 of an application 106 under test. The test script 116 is employable to exercise the application 106. The selection logic 114 serves to identify elements 406, 408 of a currently-executing component script 402 within the test script 116, contemporaneous with execution of the test script 116, that may be affected by graphical user interface changes made to the application 106. The identification of the elements 406, 408 of the currently-executing component script within the test script 116, contemporaneous with execution of the test script 116, that may be affected by the graphical user interface changes by the selection logic is contemporaneous with the exercise of the application 106 by the test script 116.

A test execution agent 108 executes a test on the application 106 through employment of the currently-executing component script 402 within the test script 116. An updater 112 serves to update the elements 406, 408 for the test on the application 106. The graphical user interface changes are made to a graphical user interface 118 of the application 106. A target interface analyzer 110 is directed to the graphical user interface 118 of the application 106. The selection logic 114 comprises a comparison engine 120 that reviews the elements 406, 408 relative to the graphical user interface 118. The graphical user interface 118 comprises a series of input screens 502 that each comprises an arrangement of input fields 604, 606, 608, 610, 612, 614, 616, 618. Each input screen 502 corresponds to a respective element 406, 408 of a set of elements 406, 408 of the test script 116 that is employable to exercise the application 106.

An exemplary approach creates test components 404 and a test script 116, without active contemporaneous user input, for test of an application 106. There is identifying of changed objects 620 on a graphical user interface 118 of the application 106. The identifying is contemporaneous with the test of the application 106. There is updating of the test script 116 without active contemporaneous user input when changes are identified in the user interface 118.

There is employing of the identifying of the changed objects 620 to generate one or more components 404 based on performance of one or more actions on the user interface 118 while the application 106 is under test. There is identifying of changes that are applicable to an existing component script 402 as a result of one or more differences in a state of the graphical user interface 118 from a state of the graphical user interface 118 while the application 106 is under test and a state of the graphical user interface 118 when the component script 402 was created or previously updated. There is applying of one or more changes to a component script 402 to promote continued execution of the component script 402 against the graphical user interface 118 in view of one or more changes to the graphical user interface 118 after the component script 402 was created or previously updated.

An embodiment of the apparatus 100 comprises a plurality of components such as one or more of electronic components, chemical components, organic components, mechanical components, hardware components, optical components, and/or computer software components. A number of such components can be combined or divided in an embodiment of the apparatus 100. In one or more exemplary embodiments, one or more features described herein in connection with one or more components and/or one or more parts thereof are applicable and/or extendible analogously to one or more other instances of the particular component and/or other components in the apparatus 100. In one or more exemplary embodiments, one or more features described herein in connection with one or more components and/or one or more parts thereof may be omitted from or modified in one or more other instances of the particular component and/or other components in the apparatus 100. An exemplary technical effect is one or more exemplary and/or desirable functions, approaches, and/or procedures. An exemplary component of an embodiment of the apparatus 100 employs and/or comprises a set and/or series of computer instructions written in or implemented with any of a number of programming languages, as will be appreciated by those skilled in the art. An embodiment of the apparatus 100 comprises any (e.g., horizontal, oblique, angled, or vertical) orientation, with the description and figures herein illustrating an exemplary orientation of an exemplary embodiment of the apparatus 100, for explanatory purposes.

An embodiment of the apparatus 100 encompasses an article and/or an article of manufacture. The article comprises one or more computer-readable signal-bearing media. The article comprises means in the one or more media for one or more exemplary and/or desirable functions, approaches, and/or procedures.

An embodiment of the apparatus 100 employs one or more computer readable signal bearing media. A computer-readable signal-bearing medium stores software, firmware and/or assembly language for performing one or more portions of one or more embodiments. An example of a computer-readable signal bearing medium for an embodiment of the apparatus 100 comprises a memory and/or recordable data storage medium. A computer-readable signal-bearing medium for an embodiment of the apparatus 100 in an example comprises one or more of a magnetic, electrical, optical, biological, chemical, and/or atomic data storage medium. For example, an embodiment of the computer-readable signal-bearing medium comprises one or more floppy disks, magnetic tapes, CDs, DVDs, hard disk drives, and/or electronic memory. In another example, an embodiment of the computer-readable signal-bearing medium comprises a modulated carrier signal transmitted over a network comprising or coupled with an embodiment of the apparatus 100, for instance, one or more of a telephone network, a local area network ("LAN"), a wide area network ("WAN"), the Internet, and/or a wireless network. A computer-readable signal-bearing medium comprises a physical computer medium and/or computer-readable signal-bearing tangible medium.

The steps or operations described herein are examples. There may be variations to these steps or operations without departing from the spirit of the invention. For example, the steps may be performed in a differing order, or steps may be added, deleted, or modified.

Although exemplary embodiment of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
a processor; and
a non-transitory computer-readable medium having modules comprising instructions to be executed by the processor, the modules comprising:
a test-script generator to:
generate a plurality of test components based on actions performed during navigation of an application under test, where each of the plurality of test components comprises a component script, wherein at least one component script is based on two or more of the actions, wherein each of the test components is self-contained and reusable, wherein the application under test includes one or more subsets of code associated with elements of a graphical user interface;
parameterize the plurality of test components by generating a unique variable to represent each graphical user interface element that accepts data during the navigation of the application under test;
for each unique variable, generate one or more inputs for the variable, wherein the one or more inputs are based on the actions performed during the navigation of the application under test;
generate one or more outputs of the at least one graphical user interface corresponding to the one or more inputs for each variable based on analysis of interface outputs observed during the actions performed during the navigation of the application under test;
store each of the plurality of parameterized test components for use in multiple test scripts;
store the inputs and outputs associated with the parameterized test components; and
generate a first test script comprising a sequence of the plurality of parameterized test components, wherein the first test script is employable to exercise the application using the stored inputs associated with the sequence of parameterized test components; and
selection logic to, contemporaneous with execution of the first test script and contemporaneous with the application being exercised by execution of the first test script using the inputs associated with the sequence of parametrized test components:
detect, based on a comparison of the stored outputs associated with the sequence of parameterized test components to outputs of the graphical user interface of the application observed during execution of the first test script, changes made to the one or more subsets of code associated with elements of the graphical user interface after the first test script is generated; and
identify test components among the plurality of test components within the first test script corresponding to the detected changes.

2. The apparatus of claim 1, wherein the first test script comprises a plurality of references to the plurality of test components.

3. The apparatus of claim 1, wherein the test-script generator is further to:
generate a second test script using the plurality of test components.

4. The apparatus of claim 3, wherein the second test script includes a subset of the plurality of test components, and the first test script includes all of the plurality of test components.

5. The apparatus of claim 4, wherein an order of the subset of the plurality of component scripts within the second test script determines the sequence that the subset of test components are executed if the second test script is used to exercise the application.

6. The apparatus of claim 1, the apparatus further comprising:
a target interface analyzer directed to the graphical user interface of the application.

7. The apparatus of claim 1, wherein the selection logic comprises a comparison engine to compare the plurality of test components to the output of the application during execution of the first test script.

8. The apparatus of claim 1, comprising a test recording agent that causes the test-script generator to store the component script within the first test script.

9. The apparatus of claim 1, comprising a process initiator that initiates management of the first test script.

10. The apparatus of claim 1, further comprising a test execution agent that executes the first test script after receiving a change event notice.

11. A method, comprising:

creating, via a test-script generator, a plurality of test components based on actions performed during navigation of an application under test comprising a graphical user interface, wherein each of the plurality of test components comprises a component script, wherein at least one component script is based on two or more of the actions, wherein each of the test components is self-contained and reusable, wherein the application under test includes one or more subsets of code associated with elements of a graphical user interface;

parameterizing, by the test-script generator, the plurality of test components by generating a unique variable to represent each graphical user interface element that accepts data during the navigation of the application under test;

for each unique variable, generating, by the test-script generator, one or more inputs for the variable, wherein the one or more inputs are based on the actions performed during the navigation of the application under test;

generating, by the test-script generator, one or more outputs of the at least one graphical user interface corresponding to the one or more inputs for each variable based on analysis of interface outputs observed during the actions performed during the navigation of the application under test;

storing each of the plurality of parameterized test components for use in multiple test scripts;

storing the inputs and outputs associated with the parameterized test components;

generating, by the test script generator, a first test script comprising a sequence of the plurality of test components, wherein the first test script is employable to exercise the application using the stored inputs associated with the sequence of parameterized test components;

detecting, by a computing device, based on a comparison of the stored outputs associated with the sequence of parameterized test components to the outputs of the graphical user interface of the application observed during execution of the first test script, changes made to the one or more subsets of code associated with elements of the graphical user interface after the first test script is generated;

identifying, by the computing device, test components among the plurality of test components within the first test script corresponding to the detected changes, wherein the identifying is contemporaneous with execution of the first test script and the test of the application; and updating, by the computing device, the first test script without active contemporaneous user input based on the identified test components.

12. The method of claim 11, further comprising:

generating a second test script using the plurality of test components.

13. The method of claim 11, wherein the first test script comprises a plurality of references to the plurality of test components.

14. A tangible, non-transitory, computer-readable medium comprising code to direct a processor to:

generate a plurality of test components based on actions performed during navigation of an application under test, wherein each of the plurality of test components comprises a component script, wherein at least one component script is based on two or more of the actions, wherein each of the test components is self-contained and reusable, wherein the application under test includes one or more subsets of code associated with elements of a graphical user interface;

parameterize the plurality of test components by generating a unique variable to represent each graphical user interface element that accepts data during the navigation of the application under test;

for each unique variable, generate one or more inputs for the variable, wherein the one or more inputs are based on the actions performed during the navigation of the application under test;

generate one or more outputs of the at least one graphical user interface corresponding to the one or more inputs for each variable based on analysis of interface outputs observed during the actions performed during the navigation of the application under test;

store each of the plurality of parameterized test components for use in multiple test scripts;

store the inputs and outputs associated with the parameterized test components;

generate a first test script comprising a sequence of the plurality of test components, wherein the first test script is employable to exercise the application using the stored inputs associated with the sequence of parameterized test components;

detect, based on a comparison of the stored outputs associated with the sequence of parameterized test components to the outputs of the graphical user interface of the application observed during execution of the first test script, changes made to the one or more subsets of code associated with elements of the graphical user interface after the first test script is generated; and identify, contemporaneous with execution of the first test script and contemporaneous with the application being exercised by execution of the first test script, text components among the plurality of test components within the first test script corresponding to the detected changes.

15. The tangible, non-transitory, computer-readable medium of claim 14, wherein the first test script comprises a plurality of references to the plurality of test components.

16. The tangible, non-transitory, computer-readable medium of claim 15, comprising code to direct the processor to generate a second test script using the plurality of test components.

17. The tangible, non-transitory, computer-readable medium of claim 14, wherein the graphical user interface comprises a series of input screens that each comprises an arrangement of input fields, wherein each input screen corresponds to a respective element of a set of test components of the test script that is employable to exercise the application.

* * * * *